United States Patent [19]

Bunker et al.

[11] Patent Number: 4,668,943

[45] Date of Patent: May 26, 1987

[54] EXCESSIVE GAS FLOW DETECTOR

[75] Inventors: Peter F. Bunker, Rotherham; Michael J. Scott, Cambridge, both of England

[73] Assignee: Bestobell (UK) Limited, Berkshire, England

[21] Appl. No.: 870,708

[22] Filed: Jun. 4, 1986

[30] Foreign Application Priority Data

Jun. 5, 1985 [GB] United Kingdom ............... 8514166

[51] Int. Cl.⁴ ............................................. G08B 21/00
[52] U.S. Cl. .................................. 340/606; 324/133; 340/611; 340/620
[58] Field of Search ............... 340/606, 607, 608, 609, 340/610, 611, 620; 116/112, 142 FP, 264-276, DIG. 7; 324/133

[56] References Cited

U.S. PATENT DOCUMENTS

| | | | |
|---|---|---|---|
| 654,372 | 7/1900 | West | 116/270 |
| 2,808,580 | 10/1957 | Fuller | 340/606 |
| 3,150,360 | 9/1964 | Stenzel | 340/606 X |
| 3,425,385 | 2/1969 | Broad, Jr. | 116/268 |
| 3,524,178 | 8/1970 | Stratton | 324/133 |
| 3,689,908 | 9/1972 | Ray | 340/606 |
| 3,880,110 | 4/1975 | Loesch et al. | 116/266 |
| 4,065,675 | 12/1977 | Gold | 340/606 X |
| 4,077,427 | 3/1978 | Rosan, Jr. et al. | 116/266 X |
| 4,486,744 | 12/1984 | Pratt et al. | 340/606 |
| 4,496,906 | 1/1985 | Clack | 324/133 X |

Primary Examiner—James L. Rowland
Assistant Examiner—Daniel Myer
Attorney, Agent, or Firm—Kane, Dalsimer, Kane, Sullivan and Kurucz

[57] ABSTRACT

An excessive gas flow detector has a probe in which an electrode and immediately surrounding part of an insulating sleeve are protected by a shielding ring surrounding the electrode from direct impingement of spray carried by gas sweeping down into a well under excessive gas flow conditions. A test unit for plugging into a socket of the detector gives an indication on light emitting diodes of whether there is an excessive or normal gas flow through the detector.

7 Claims, 5 Drawing Figures

EXCESSIVE GAS FLOW DETECTOR

This invention relates to excessive gas flow detectors which are inserted into pipelines for detecting an excessive flow of gas. This type of gas flow detector is commonly inserted adjacent to a steam trap so as to detect unacceptable venting of steam through the trap.

A known detector of this type is described in GB-A-No. 2112151 and has a well in the bottom of a passage through the detector body which is made of metal. An exposed electrode is mounted in the well and is electrically insulated from the metal body, and a deflector is mounted in the top of the passage, above the well, to deflect gas down towards the well. This detector operates in either one of two states. The first state occurs when there is a low flow rate of steam, or other wet gas through the passage and, in this state, condensed water fills the well and covers the electrode, thus completing an electrical circuit between the electrode and the metal body. In the second state, corresponding to a high flow rate of steam, the deflector deflects the gas, as it passes through the passage, down towards the well, thereby displacing condensate out of the well and breaking the circuit between the electrode and the metal body. This enables the detector to be used to monitor continuously the flow rate of gas and to give a warning signal, via leads connected to the electrode and the body, to an operator who may be some considerable distance away from the detector. The electrical circuit may alternatively be formed between two electrodes mounted in insulating material, thereby removing the need for the detector body to be made of an electrically conductive material.

However, we have appreciated that the above type of detector has problems which prevent it from giving a reliable indication of the flow rate through the detector, particularly when the gas is exceptionally wet. Firstly, when the detector is in its second state (corresponding to the high flow rate of gas) spray is deflected down on to the electrode by the deflector and, whilst this may displace most of the condensate out of the well, a thin layer of water is continuously deposited by the deflected spray upon the electrode and the metal body in the well. This provides an electrically conductive path between the electrode and the metal body, thereby giving an erroneous indication of a low flow rate. Secondly, the deflected spray, apart from depositing a thin film of condensate, also abrades and pits the electrode and insulating material in which the electrode is mounted. We have found that the abraded surface of the electrode and insulating material retains any water which is left or deposited on the surface. As a result, retained water may complete the electrically conductive path and give a spurious indication.

FR-A-No. 1400794 discloses a detector having a chamber into and out of the roof of which lead inlet and outlet passages, respectively. Projecting downwards from the chamber roof are two parallel walls extending transversely to the direction of flow and the upstream one of these walls extends across the entire width of the chamber. An electrode extends down from the chamber roof between the two walls and under normal gas flow conditions is immersed in condensate which collects in the chamber. All of the gas flow has to pass through the chamber and under the upstream wall. Consequently, under excessive gas flow conditions, the gas flows under the upstream wall and past the downstream wall at such a rate that the surface of the pool of condensate is pushed down to the bottom of the chamber and the electrode is exposed. Since the chamber is offset from the inlet and outlet passages, the device as a whole is bulky and heavy. Also, these features, and the fact that there is a wall in the chamber under which the entire gas flow must bubble under normal gas flow conditions, ensures that the device offers considerable, unwanted resistance to the gas flow, together with the risk of the turbulent bubbling repeatedly exposing the electrode to the gas flow and immersing it in the pool of condensate.

In accordance with the present invention, an excessive gas flow detector comprises a body having a passage through which, in use, gas flows; a well at the bottom of the passage for collecting liquid deposited, in use, from gas flowing through the passage; a probe projecting from the wall opposite the well, across the passage and into the well and having at least one electrode exposed in the well surrounded by an insulating material and arranged to be immersed in liquid in the well under normal gas flow conditions to complete an electrical circuit while gas flows around the sides of the probe, the probe being arranged to cause displacement of liquid from the well under excessive gas flow conditions by causing gas flowing around the sides of the probe to create a pressure differential in the passage between the upstream and downstream sides of the probe which sucks liquid out of the well, whereby the electrical circuit is broken; and an annular shielding ring mounted on the tip of the probe around the electrode for shielding the electrode and immediately surrounding insulating material from direct impingement by liquid drops carried by the gas flow during the excessive flow conditions.

The shielding ring ensures that the deflected spray does not impinge directly on or adjacent to the surface of the electrode, thereby preventing the erosion and pitting of the insulating material in which the electrode is mounted and preventing a deposited film of water from completing the electrical circuit.

The shielding ring may be provided by an extension of the insulating material in which the electrode is mounted. For example, the extension may surround and be spaced from the electrode tip.

As is the case with the prior art detectors, the detector is preferably directly substitutable for a standard barrel nipple of the type commonly used in industrial applications.

The invention will now be described by way of example with reference to the accompanying drawings, in which.

Figure 1:
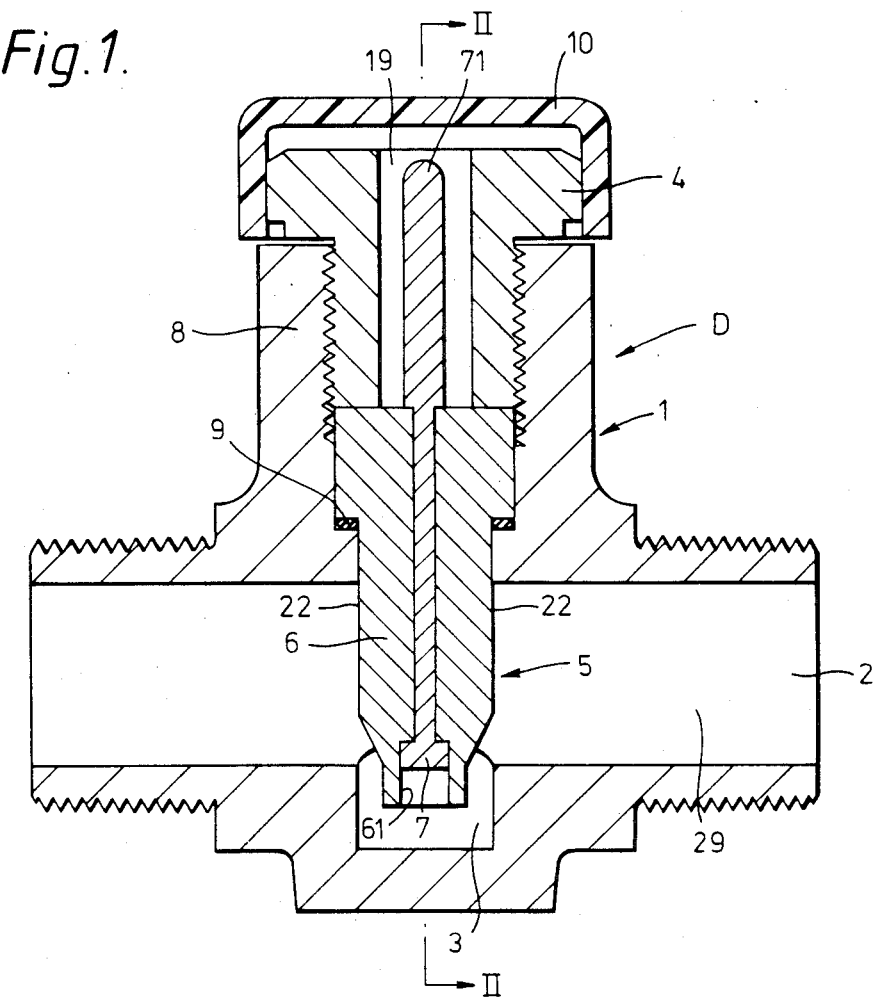
FIG. 1 is a vertical, longitudinal section of a detector in accordance with the present invention.
Figure 2:
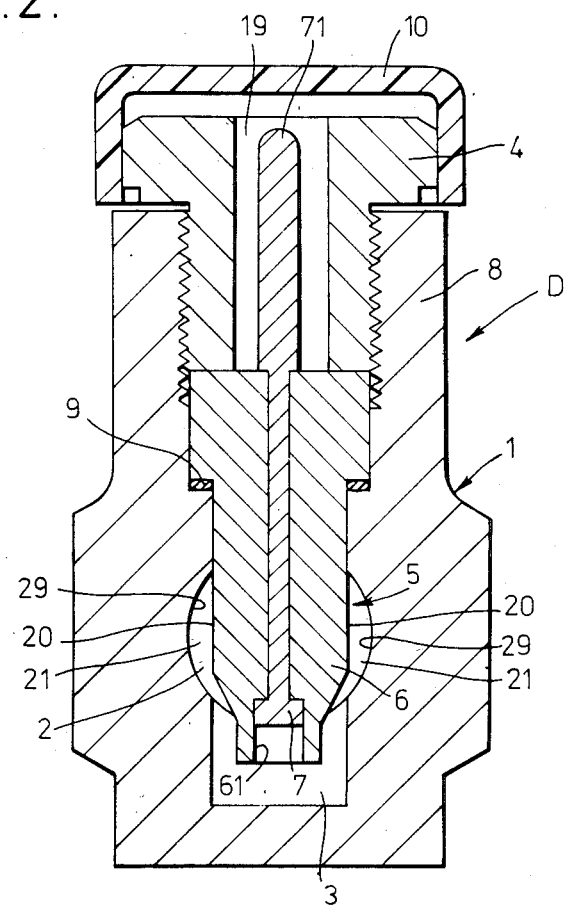
FIG. 2 is a vertical, transverse section of the detector taken on the line II—II of FIG. 1.

As shown in FIGS. 1 and 2, the detector D comprises a metallic body 1, which is externally screw-threaded at each end and is substitutable for a barrel nipple in a conventional pipeline, in practice upstream of a steam trap in a steamline. The body 1 defines a passage 2 of cylindrical cross-section, formed with a well 3, in which water or other liquid condensate from gas passing, in use, through the passage 2, will collect. The body 1 has an internally screw-threaded sleeve 8, which receives a gland nut 4, supporting a probe 5 which extends across the passage 2 and into the well 3. The probe 5 is sealed against the body 1 by a gasket g and incorporates a ceramic sleeve 6 of insulating material and a metallic electrode 7. By extending across the passage 2, the probe 5 defines gaps 21 between side walls 2g of the passage 2 and sides 20 of the probe 5. A removable, protective, plastics cap 10 is shown slid over the nut 4 so as to protect the electrode 7.

In use, steam, or other wet gas, flows through the passage 2, passing around the sides 20 of the probe 5 and through the gaps 21, and the well 3 becomes filled with a deposited liquid, typically water. This completes an electrically conductive path between the electrode 7 and the body 1, to provide an indication that there is a normal gas flow. The detector D is typically mounted upstream of a steam trap, failure of which will cause an excessively high steam flow through the passage 2. This high flow rate will cause a pressure differential in the passage 2 between upstream and downstream sides 22 of the probe 5 which causes the liquid, which has previously collected in the well 3, to be sucked out of the well. This will break the electrically conductive path between the electrode 7 and the body 1 and give a corresponding indication.

The insulating sleeve 6 extends around, and projects beyond the electrode 7, to prevent any liquid spray, carried along by the gas flow in the passage 2, from impinging directly on the electrode 7, or an immediately surrounding part 61 of the sleeve 6. This ensures that there will be no pitting of the electrode 7 or immediately surrounding part 61 of the sleeve 6, which might retain liquid and cause an unwanted electrically conductive path between the electrode 7 and the body 1.

An upper part 71 of the electrode 7 and the gland nut 4 form concentric terminals of a socket 19 serving as an externally accessible electrical coupling of the detector D. As will be described later, this coupling enables the state of gas flow through the detector D to be determined readily.

Figure 3:
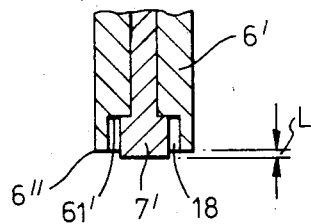
FIG. 3 is a section of a modified probe tip suitable for use with the detector of FIG. 1.

FIG. 3 shows a modified design of the tip of the probe 5 shown in FIGS. 1 and 2, in which a metallic electrode 7', instead of being recessed in, projects from an insulating sleeve 6' by a small distance L. The sleeve 6' surrounds the tip of the electrode 7' but is spaced from it by an annular gap 18. This gap ensures that, as long as the electrode 7' does not project too far, both the electrode 7' and an immediately surrounding part 61' of the sleeve 6' facing into the gap 18 will be protected by an edge 6'' of the sleeve 6' from direct impingement of, and pitting by, spray carried by gas sweeping down into the well under excessive gas flow conditions. We have found that the optimum value of the distance L, which provides the best balance between the increased ease of manufacture and the increased risk of unwanted direct spray impingement as the electrode is allowed to project further, occurs when the distance L has a value of up to 0.5 mm.

Figure 4:
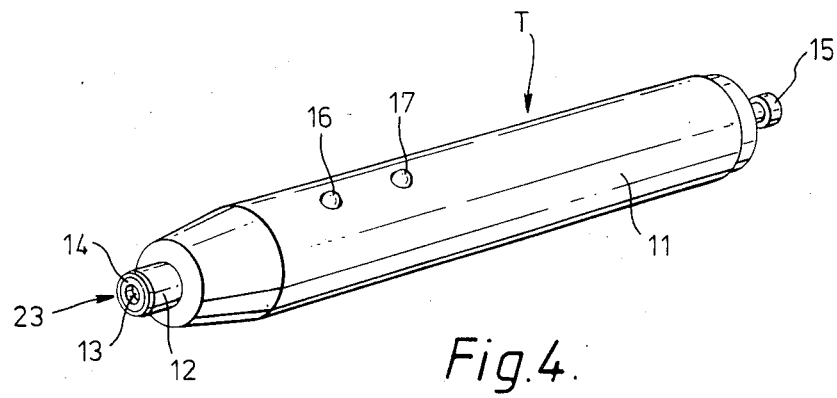
FIG. 4 is a perspective view of a portable test unit for use with detectors of the present invention; and, FIG. 5 is a perspective view of the test unit of FIG. 4 when in use.

FIG. 4 shows a hand-held portable test unit T, shaped in the form of a pen, which may be plugged into a detector of the type shown in FIGS. 1 and 2 to give an indication as to whether there is normal or excessive gas flow therethrough. The test unit T has an elongate, cylindrical, plastics body 11 at one end of which is an electrical coupling 23 having a pair of terminals 12,13 mounted on the outside of and inside of, respectively, a tubular, insulative insert 14. This arrangement enables the electrical coupling 23 of the test unit to be plugged into the top of the detector D, once the protective cap 10 has been removed, so that the outermost terminal 12 is in electrical contact with the gland nut 4 and the innermost terminal 13 is in electrical contact with the upper part 71 of the electrode 7. The test unit T is powered by an internal battery and, once a switch 15 at the end of the test unit remote from the terminals 12,13 has been depressed, circuitry mounted inside the body 11 and connected to the terminals 12,13 is energized to determine on which side of a threshold value (for example, 220k$\Omega$) lies the resistance connected between the terminals 12,13 of the test unit T. As the resistance between the two terminals 12,13 is that of the detector D, and this resistance is variable, having a very large value when there is excessive gas flow through the detector and a low value when there is normal gas flow through the detector, the circuitry inside the test unit T is arranged to illuminate a red light emitting diode (LED) 16 upon detecting that the resistance of the detector is greater than the threshold resistance value and to illuminate a green LED 17 upon detecting that the resistance of the detector is below the threshold value. In other words, by sensing the resistance of the circuit through the detector D, the circuitry is serving to discriminate between the electrical circuit through the detector D being complete or broken, and the two LEDs 16,17, which are mounted on the body 11, serve to indicate whether the circuit is complete or broken, thereby giving an instantaneous indication of the state of gas flow through the detector D.

Figure 5:
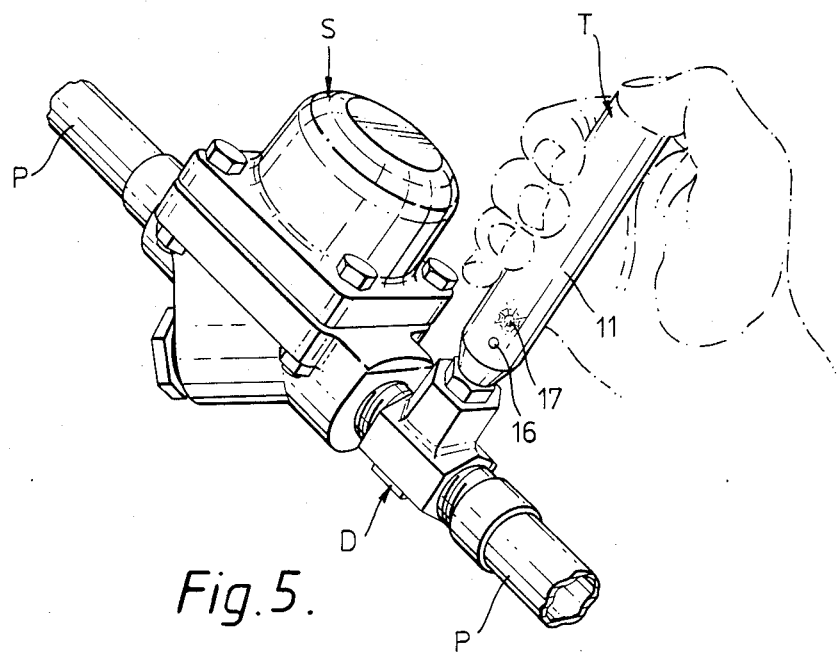

In FIG. 5, a detector D in accordance with the present invention is positioned upstream of a standard steam trap S, both of which are connected to respective ends of a gap in piping P. The test unit T of FIG. 4 is shown inserted into the detector D, with the operator's thumb depressing the switch 15 (see FIG. 4) and, since in this example there is assumed to be a normal gas flow rate through the detector D and steam trap S (i.e. the steam trap S is not venting excessively), the green LED 17 is illuminated to indicate this flow state.

If the proximity of other objects makes it impossible to plug the test unit T directly into the detector D, then a fly lead may be used to connect them together electrically.

If there are a large number of detectors D and/or detectors positioned in inaccessible positions, it may be desirable to use a remote monitoring system instead of a portable test unit of the type shown in FIG. 4. Such a remote monitoring system would be connected electrically to each of the detectors to be monitored and would determine, as does the pen test unit, the state of gas flow through each detector by seeing whether the detector's resistance is above or below a threshold value. The information as to whether there is an excessive or normal gas flow through each detector may be presented on a display board on which there are pairs of red and green LEDs corresponding to respective ones of the detectors connected to the system. In this way, an operator can monitor easily the state of gas flow through a large number of detectors.

If it is desired to display or use this information a long distance (e.g. 2 km) from the places of siting of the detectors, signals indicating the flow state through each detector may be multiplexed and passed down a line at the end of which demultiplexing occurs to provide seperate indications, e.g. on pairs of LEDs, of the flow state through each detector. Alternatively, the multiplexed signal may be fed into a computerized system for further processing.

We claim:

1. An excessive gas flow detector comprising a body defining a passage therethrough for a flow of gas; a well defined in said body at a bottom of said passage for collecting liquid deposited from said gas flow; a probe projecting from a top of said passage, across said passage spaced from side walls thereof and into said well and having at least one electrode exposed in said well and surrounded by an insulating material, said electrode(s) being adapted to be immersed in said liquid collected in said well under a normal gas flow condition to complete an electrical circuit while said gas flow flows around both sides of said probe, said probe being adapted to cause displacement of said collected liquid from said well under an excessive gas flow condition by causing said gas flow flowing around said sides of said probe to create a pressure differential in said passage between upstream and downstream sides of said probe which sucks said collected liquid out of said well, whereby said electrical circuit is broken; and an annular shielding ring mounted on a tip of said probe around said electrode(s) for shielding said electrode(s) and an immediately surrounding part of said insulating material from direct impingement by liquid drops carried by said gas flow during said excessive gas flow condition.

2. A detector according to claim 1, wherein said shielding ring is provided by an extension of said insulating material in which said at least one electrode is mounted.

3. A detector according to claim 2, wherein said extension surrounds and is spaced from a tip of said at least one electrode.

4. An excessive gas flow detector comprising a body defining a passage therethrough for a flow of gas; a well defined in said body at a bottom of said passage for collecting liquid deposited from said gas flow; a probe projecting from a top of said passage across said passage into said well and having at least one electrode exposed in said well and surrounded by an insulating material, said at least one electrode being adapted to be immersed in said liquid collected in said well under a normal gas flow condition to complete an electrical circuit but to be clear of said liquid when liquid is displaced from said well under an excessive gas flow condition whereby said electrical circuit is broken; and an externally accessible first electrical coupling incorporating at least one first terminal connected to said at least one electrode; in combination with a portable test unit comprising a body having a second electrical coupling incorporating at least one further terminal and adapted to be fitted to said first electrical coupling whereupon said at least one terminal and said at least one further terminal contact one another; means within said body connected to said at least one further terminal and adapted to discriminate between whether said electrical circuit is completed or broken; and display means carried by said body to indicate whether said circuit is completed or broken.

5. A combination according to claim 4, wherein said first electrical coupling means comprises a socket for receiving said second electrical coupling and provided with concentric terminals.

6. A combination according to claim 4, wherein said body incorporates a battery power source for energizing said discriminating means and display means.

7. A combination according to claim 4, wherein said display means are differently coloured lights.

* * * * *